United States Patent [19]

Ninomiya et al.

[11] Patent Number: 4,709,277

[45] Date of Patent: Nov. 24, 1987

[54] EDITING DATA CONVERTING APPARATUS

[75] Inventors: Ichiro Ninomiya; Soujiro Kizu; Hidehiko Sashoh, all of Kanagawa, Japan

[73] Assignee: Sony Corporation, Tokyo, Japan

[21] Appl. No.: 716,648

[22] Filed: Mar. 27, 1985

[30] Foreign Application Priority Data

Mar. 28, 1984 [JP] Japan ................... 59-60321

[51] Int. Cl.$^4$ ............... H04N 5/782; G11B 27/02
[52] U.S. Cl. ................... 360/14.3; 360/33.1; 360/72.2; 360/9.1; 360/14.1; 358/335; 358/346; 358/311; 358/140
[58] Field of Search ............ 360/14.1, 14.2, 14.3, 360/33.1, 72.2, 9.1; 358/335, 346, 311, 140, 214, 97

[56] References Cited

U.S. PATENT DOCUMENTS

| | | | |
|---|---|---|---|
| 3,030,441 | 4/1962 | Nemeth | 360/14.1 |
| 4,393,415 | 7/1983 | Hurst | 358/346 |
| 4,496,991 | 1/1985 | Dyfverman | 360/14.1 |
| 4,587,572 | 5/1986 | DiGiulio | 360/14.3 |

OTHER PUBLICATIONS

"A Videotape Editing System for Film Post-Production", by Schneider et al., SMPTE Journal, Jun. 1982, pp. 552-554.

"Video-Assisted Film Editing System", by Kary, SMPTE Journal, Jun. 1982, pp. 547-551.

"An Automatic Editing System", by Miura et al., SMPTE Journal, Oct. 1975, pp. 781-789.

Primary Examiner—Alan Faber
Attorney, Agent, or Firm—Lewis H. Eslinger; Alvin Sinderbrand

[57] ABSTRACT

Editing data producing apparatus produces first data for editing a cinema film based on second editing data obtained by editing a television video signal reproduced from a record medium on which a cinema signal is recorded in a manner of the television video signal. The video signal is obtained from the cinema signal by an m:n ratio (m and n are both integers) pull-down conversion. An editing video frame address representative of an editing location of the video signal and a reference video frame address representative of the video frame address corresponding to a predetermined cinema frame address of the cinema signal are supplied to a circuit which then produces a relative address between the editing video frame address and the reference video frame address. A circuit is provided for dividing a number representative of the relative address by a number bearing a predetermined relation to m and n, so that a remainder is detected. In response to the remainder and field data representative of a field status of the editing video frame address, the video frame address is converted to the cinema frame address.

4 Claims, 5 Drawing Figures

EDITING DATA CONVERTING APPARATUS

BACKGROUND OF THE INVENTION

1. Field of the Invention

This invention relates generally to editing data converting apparatus, and more particularly to an editing data converting system for use with an editing apparatus for a cinema film in which a cinema signal of the cinema film is converted to a standard television signal and recorded on a magnetic tape and the cinema film is edited on the basis of an editing of the magnetic tape.

2. Description of the Prior Art

Recently, an editing apparatus for editing a video tape has been rapidly developed and various kinds of automatic editing apparatus are now available on the market, in which an editing point or location is specified by an address signal and editing data stored in a computer is used whereby the dubbing of the video tape is carried out by batch processing. Since such video tape editing apparatus can increase the accuracy of editing and can easily change the editing location and so on, the video tape editing apparatus becomes useful for editing cinema film. In editing the cinema film by using such video tape editing apparatus, a video tape for editing or a so-called work tape on which a cinema signal of the cinema film is recorded is edited by using the above-described video tape editing apparatus and on the basis of the editing data thus obtained, the original cinema film is cut and then connected.

An example of a prior art video signal editing system will be described with reference to FIG. 1.

FIG. 1 is a schematic diagram showing an example of a cinema film editing process which is carried out by using a prior art video tape editing apparatus. In FIG. 1, the picture image of an original cinema film 1 is converted to a standard television signal of, for example, an NTSC (national television standard committee) system by a so-called telecine apparatus 2 which comprises a television projector and an image pick-up device. This standard television signal from the telecine apparatus 2 is supplied to a video tape recorder (VTR) 3 for use in making a work video tape and then recorded on an off-line cassette type video tape or work video tape 4. In this case, since an absolute address of a frame of the cinema film 1 representated by the precise "hour, minute, second" and an absolute address of a frame of a cassette video tape 4 similarly representated by the precise "hour, minute, second" are normally different from each other, data of a corresponding relation therebetween including a reference cinema frame address and a reference video frame address thereof is supplied to the editing apparatus before starting the editing. Such work cassette video tape 4 is loaded onto a pluraltiy of editing VTRs $5_1$, $5_2$ and $5_3$. Reference numerals 6 and 7 respectively designate a control/memory section and an operation keyboard pad or table, and the control/memory section 6 is connected through interfaces provided therein to the editing VTRs $5_1$, $5_2$ and $5_3$. Various editing operations are carried out by using a full keyboard, a function key, a ten key and so on of the operation keyboard pad 7. Reference numeral 8 designates a display section of the editing apparatus and reference numeral 9 designates a picture image monitor. The states of the VTRs $5_1$, $5_2$ and $5_3$, an editing information or data and so on are displayed on the display section 8. After the editing is ended, an editing list 10 of 24-frame film mode is printed out from the control/memory section 6. Then, in accordance with this editing list 10, the cinema film editing is carried out by a cinema film editing apparatus 11 and thus an edited film 12 is obtained therefrom.

As is known well, a standard speed of a cinema film is 24 frame/second and a standard speed of a television video tape of the standard NTSC system adopted in Japan is 30 frame/second (=60 field/second). Thus, the number of the picture images of the cinema film and that of the picture images of the television video tape are different from each other per unit time and at every period of 1/12 second, 2 frames of the cinema film are corresponding to 5 fields of the television video signal.

For this reason, in the television projector, the cinema film is not pulled-down (shifted) at every 1/24 second in an equal interval but in the period of 1/12 second, a frame at an odd address of the cinema film is transmitted at every 1/30 second and a frame at an even address of the cinema film is transmitted at every 1/20 second, so that successive frames of the cinema film are made to correspond respectively to 2 fields and 3 fields of the television video signal. This operation is repeated to thereby pull-down the cinema film at 24 frames per second. Such pull-dwon system is called a 3/2 pull-down system and is now widely used.

FIG. 2 schematically illustrates the concept of the above-described 3/2 pull-down system. In FIG. 2, letters F and V respectively designate one unit length of a cinema film, namely, 4 frames (relative addresses $F_0$ to $F_3$) of the cinema film and one unit length of the television video signal (video tape), namely, 5 frames (relative video addresses $V_0$ to $V_4$) of the video tape. In FIG. 2, reference letter Pd designates a film of the 3/2 pull-down system.

As will be clear from FIG. 2, a first field and a second field of each of the frames $V_1$ and $V_2$ at first and second addresses of the video tape respectively correspond to picture images of two adjacent frames (for example, $F_0$, $F_1$ and $F_1$, $F_2$) of the cinema film. In the general video tape editing apparatus, since the resolution of the address signal, for example, the longitudinal time code of, for example, SMPTE (society of motion picture and television engineers) is determined by a frame unit, if either of the above-mentioned first and second frames $V_1$ and $V_2$ is designated as an editing point, it is not possible to specify the frame address of the cinema film immediately.

In the prior art, without considering the existence of the frames of the video tape such as the above-described $V_1$ and $V_2$ which bridge two frames of the cinema film, the editing data of the video tape is properly converted to the editing data of the cinema film. Thus, there is then a defect that the editing becomes inevitably low in accuracy.

Furthermore, if field information or data is added to the address signal and then the editing of the video tape is carried out, film editing data of high accuracy is obtained from the video tape editing data. To this end, however, since the existing video tape editing apparatus and VTR must be modified extensively, the manufacturing cost of the editing apparatus and VTR is increased and this is not economical. In addition, if by using the existing video tape editing list of 30 frames as an intermediate medium, the film editing list for 24 frames of the cinema film is printed out, the field data is dropped out.

OBJECTS AND SUMMARY OF THE INVENTION

It is an object of this invention to provide data converting system for use in an edition editing cinema film means of conventional video tape editing apparatus.

It is another object of this invention to provide an editing data converting system capable of carrying out cinema film editing with high accuracy even by using an existing video tape editing apparatus having a resolution of a frame unit.

According to an aspect of the present invention, there is provided an editing data producing apparatus for producing first editing data for editing a cinema film based on second editing data obtained by editing a video signal reproduced from a record medium on which a cinema signal is recorded in a manner of said video signal, and video signal being obtained from said cinema signal by an m : n ratio (m and n are both integers) pull-down conversion, said apparatus comprising:

(a) means for supplying an editing video frame address representative of an editing location of said televivideo signal;

(b) means for sypplying a reference video frame address representative of a predetermined cinema frame address of said cinema singal;

(c) means for producing a relative address between said editing video frame address and said reference video frame address;

(d) means for dividing a number representative of said relative address by a number which depends upon said m and n, so that a remainder is detected; and (e) means responsive to said remainder and field data representative of a field status of said video signal at said editing location for converting said video frame address to a corresponding cinema frame address.

According to another aspect of the present invention, there is provided apparatus for converting a first frame address of a video signal having a first frame frequency and a field frequency twice said first frame frequency to a second frame address of said video signal, said video signal being converted to a second frame frequency by a pull-down conversion having a predetermined ratio in relation to said first and second frame frequencies, said apparatus comprising:

(a) means for supplying an editing video frame address representative of an editing location of said video signal;

(b) means for supplying a reference video frame address representative of a predetermined frame address of said video signal;

(c) means for producing a relative address between said editing video frame address and said reference video frame address;

(d) means for dividing a number representative of said relative address by a number bearing a predetermined relation to said pull-down conversion ratio so that a remainder is detected; and (e) means responsive to said remainder and to field data representative of a field status of said video signal at said editing location for converting said first frame address to said second frame address.

These and other objects, features and advantages of the present invention will become apparent from the following detailed description of the preferred embodiment taken in conjunction with the accompanying drawings, through-out which like reference numerals designate like elements and parts.

DESCRIPTION OF THE PREFERRED EMBODIMENT

Now, an embodiment of the editing data converting system according to this invention will hereinafter be described with reference to FIGS. 3 to 5.

Generally, a helical scan-type VTR can produce a picture image in a still mode, a slow motion mode and so on and hence this helical scan-type VTR is used for editing a video tape with convenience. In this case, however, it becomes impossible to detect or read a longitudinal time code (hereinafter simply referred to as LTC) recorded on a cue track of a video tape. Therefore, it is previously proposed by the present applicant to insert a time code into a vertical blanking period of a television signal, which is called a VITC (vertical interval time code) and used widely.

This VITC is inserted into 12H (H is the horizontal line or period) and 14H of each field of the television signal and the VITC includes a one-bit field mark which becomes "0" at the first field and "1" at the second field.

Figure 1:
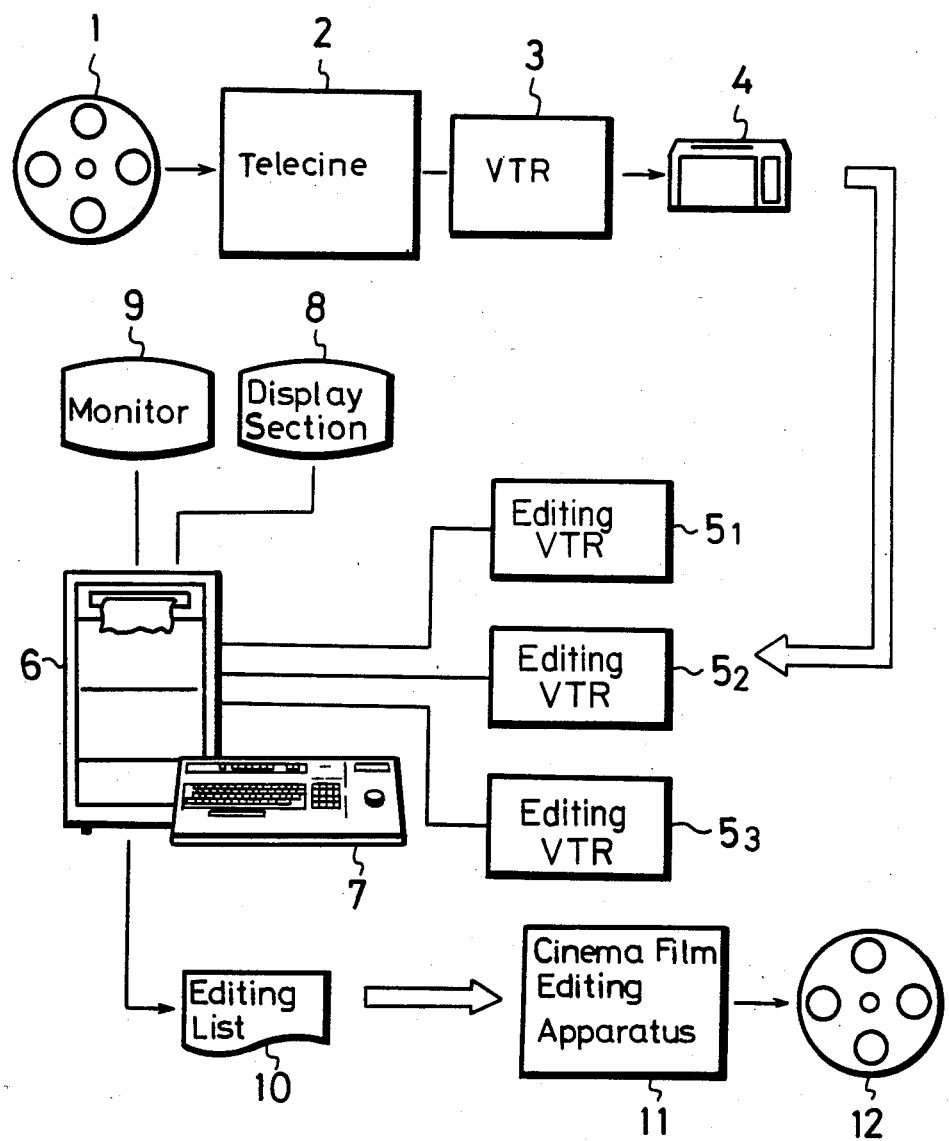
FIG. 1 is a schematic diagram showing an example of a prior art video signal editing system for use in editing a cinema film.
Figure 2:
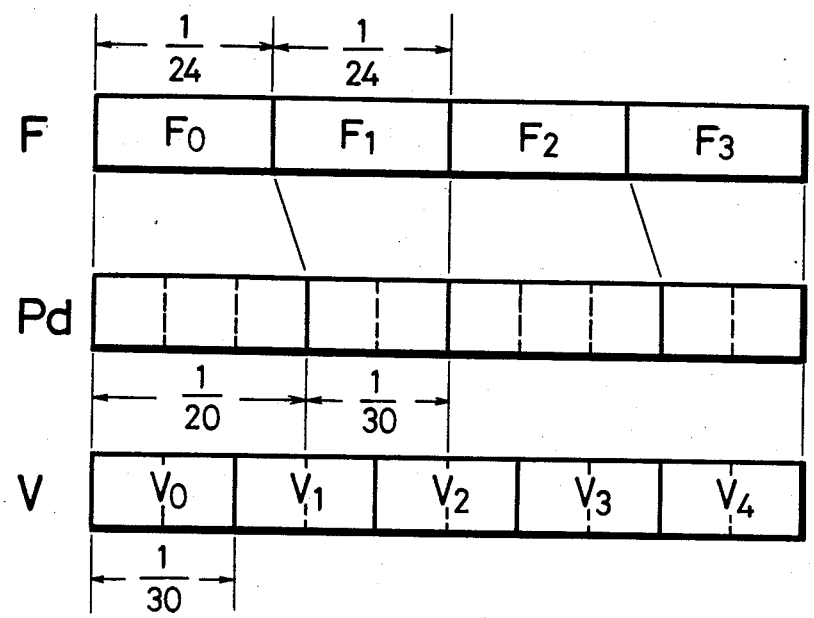
FIG. 2 is a schematic diagram useful for explaining a time relation between a cinema film and a television video signal.
Figure 3:
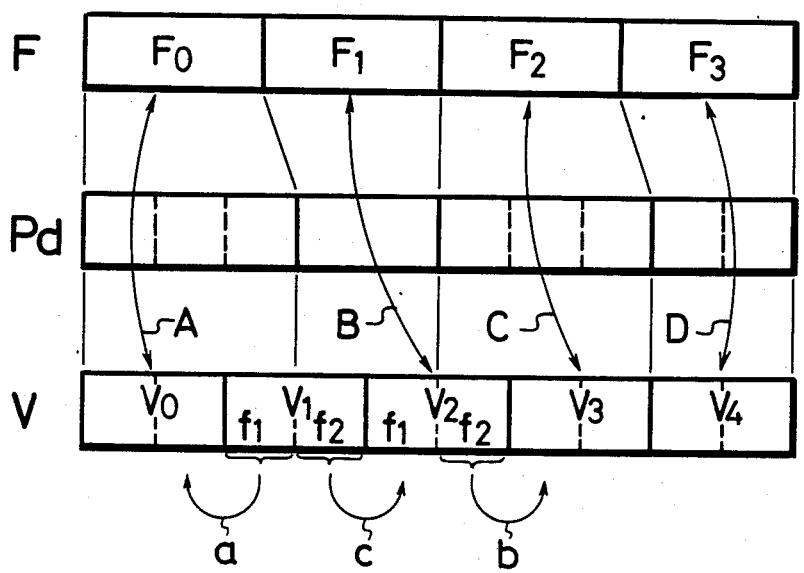
FIG. 3 is a schematic diagram useful for explaining the present invention.

With reference to FIG. 3, the argorithm (calculating method) for converting one frame of the video tape corresponding to two frames to a cinema film by using this field data of the VITC will be described.

In FIG. 3, reference numerals $f_1$ and $f_2$ respectively designate the first and second fields in each frame of the video tape.

Let it be assumed that when a record start position of the video tape edition or a so-called IN-point is specified in an arbitrary video frame address $V_x$, 5 frames which are the unit length of the video tape are repeatedly searched from the reference frame address $V_{ref}$ of the video tape and for example the first field $f_1$ within the relative frame address $V_1$ is specified. Then, since this field ($V_1$, $f_1$) inherently corresponds to the frame address $F_0$ of the cinema film, in order to match this field with the $V_0$ frame which corresponds to the frame address $F_0$ of the cinema film, 1 is subtracted from the frame address $V_1$ of the video tape as shown by an arrow a in FIG. 3.

Similarly, when the second field $f_2$ of the frame $V_2$ is specified as the IN-point, since this field ($V_2$, $f_2$) inherently corresponds to the frame address $F_2$ of the cinema film,, 1 is added to the frame address $V_2$ to thereby convert the same to the frame address $V_3$ which corresponds to the frame address $F_2$ of the cinema film as shown by an arrow b.

When the field ($V_1$, $f_2$) is specified as the IN-point, 1 is added to its frame address to thereby convert the same to the frame address $V_2$ as shown by an arrow c. On the other hand, if the frame address of the IN-point belongs to $V_0$, $V_3$ and $V_4$, the frame addresses thereof are not converted.

With respect to an edit end point or so-called OUT-point, the frame address conversion can be carried out similarly.

By the above-mentioned conversion of the relative frame address, as shown by arrows A, B, C and D in FIG. 3, the frame addresses $V_0$, $V_2$, $V_3$ and $V_4$ thus converted on the video tape are respectively made to correspond to the frame addresses $F_0$, $F_1$, $F_2$ $F_3$ on the cinema film one by one.

Figure 4:
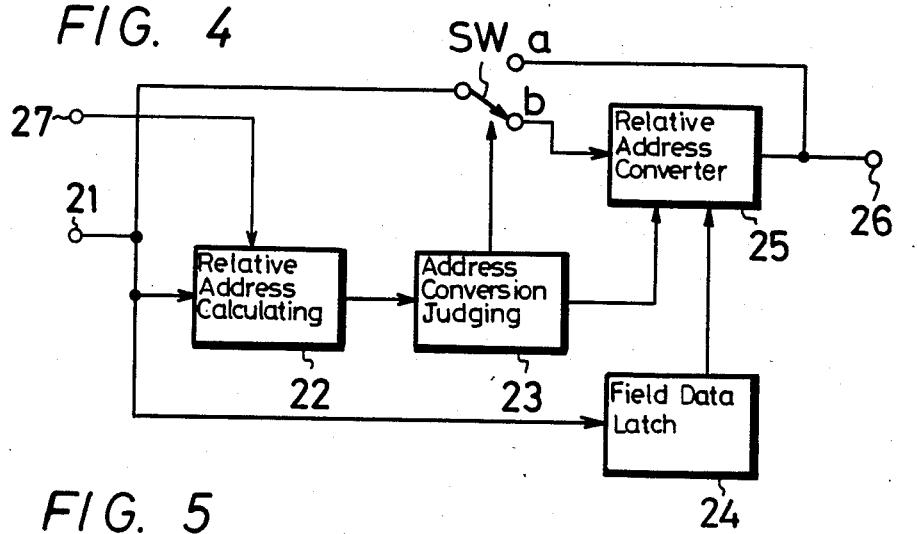
FIGS. 4 and 5 are respectively a function block diagram showing an embodiment of an editing data converting system according to this invention and a flow chart thereof.
Figure 5:
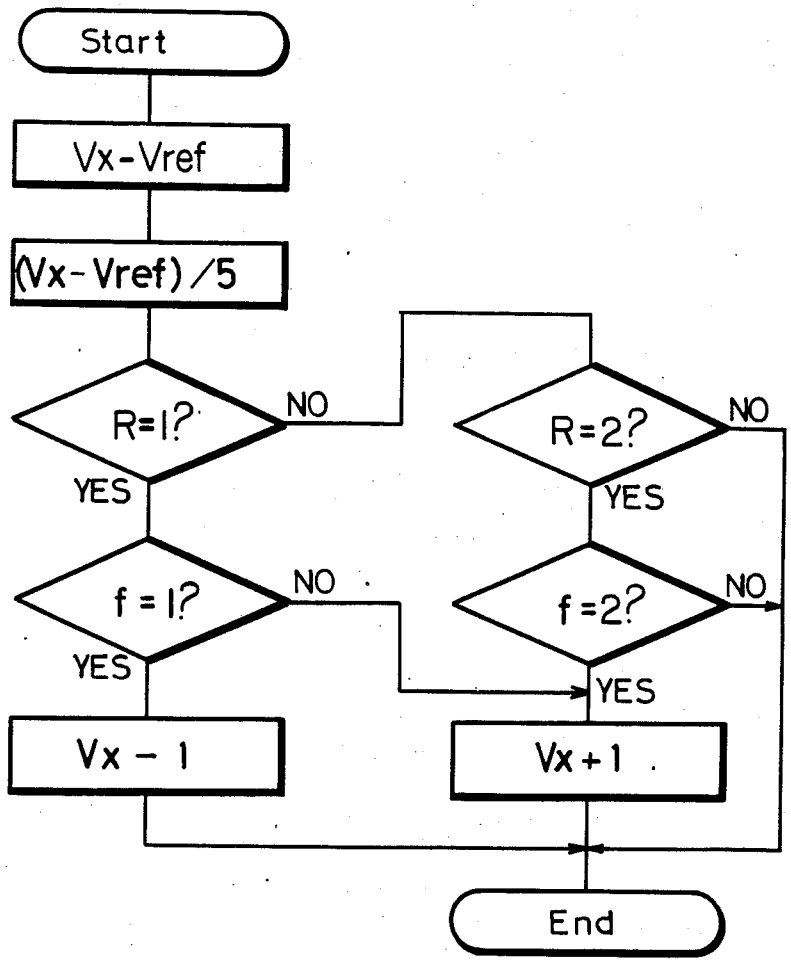

FIG. 4 is a function block diagram of an embodiment of the editing data converting system according to this invention in which the frame address conversion process is carried out by a computer. Referring to a flow chart of FIG. 5, the circuit arrangement and the operation of the editing data converting system of this invention shown in FIG. 4 will be described in detail hereinafter.

As shown in FIG. 4, a frame data $V_x$ at the edit point (IN-point) which is applied to an input terminal 21 is fed to a relative address calculating means 22 in which it is subtracted by a reference frame data $V_{ref}$ (this reference frame data $V_{ref}$ corresponds to the frame $V_0$) which is supplied through a terminal 27 and then is divided by the afore-said unit length of the television signal, or 5 frames and, then the relative frame address is calculated by its remainder. The remainder or the relative frame address obtained from the calculating means 22 is supplied to an address conversion judging means 23 in which it is judged whether the frame address must be converted or not. When the 0, 3 or 4, in other words, the relative frame address becomes $V_0$, $V_3$ or $V_4$, it is not necessary to convert the frame address so that the frame data $V_x$ from the input terminal 21 is delivered to an output terminal 26 through a contact a of a switching means SW which is changeably controlled by the address conversion judging means 23. On the other hand, when the remainder is 1 or 2, or the relative frame address becomes $V_1$ or $V_2$, the frame data $V_x$ from the input terminal 21 is supplied to a relative address converting means 25 through a contact b of the switching means SW which is selectively changed in position to the state as shown in FIG. 4 by the address conversion judging means 23. At the same time, the field data of the frame data $V_x$ representative of the editing point is latched in a field data latching means 24 and in accordance with the combination of the field data with the relative address, the frame address conversion is carried out by using the addition and/or subtraction of 1 address to and/or from the frame address data in the relative frame address converting means 25. Thereafter, the editing data is delivered to the output terminal 26.

As described above in detail, according to this invention, by using the field data of the television signal recorded on the video tape, the frame address of the video tape is converted so that the frame address of the video tape corresponds to the frame address of the cinema film one by one. Thus, it is possible to carry out the cinema film editing with high precision by using the existing video tape editing apparatus.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. Editing data producing apparatus for producing first editing data for editing a cinema film based on second editing data obtained by editing a video signal reproduced from a record medium on which a cinema signal is recorded in a manner of said video signal, said video signal being obtained from said cinema signal by an m : n ratio pull-down conversion, wherein m and n are both integers; said apparatus comprising:
   means for supplying an editing video frame address representative of an editing location of said video signal;
   means for supplying a reference video frame address representative of a predetermined cinema frame address of said cinema signal;
   means for producing a relative address between said editing video frame address and said reference video frame address;
   means for dividing a number representative of said relative address by a number which depends upon said m and n, so that a remainder is detected; and
   means responsive to said remainder and to field data representative of a field status of said video signal at said editing location for converting said video frame address to a corresponding cinema frame address.

2. Apparatus according to claim 1; in which said means for producing a relative address includes subtracting means for subtracting said reference video frame address from said editing video frame address.

3. Apparatus according to claim 1; in which said means for converting said video frame address to said corresponding cinema frame address includes an arithmetic circuit for adding 1 to said video frame address when said remainder is 1 or 2 and said field data is for an even field, and for subtracting 1 from said video frame address when said remainder is 1 and said field data is for an odd field.

4. Apparatus for converting a first frame address of a video signal having a first frame frequency and a field frequency twice said first frame frequency to a second frame address of said video signal, said video signal being converted to a second frame frequency by a pull-down conversion having a predetermined ratio in relation to said first and second frame frequencies; said apparatus comprising:
   means for supplying an editing video frame address representative of an editing location of said video signal;
   means for supplying a reference video frame address representative of a predetermined frame address of said video signal;
   means for producing a relative address between said editing video frame address and said reference video frame address;
   means for dividing a number representative of said relative address by a number bearing a predetermined relation to said pull-down conversion ratio so that a remainder is detected; and
   means responsive to said remainder and to field data representative of a field status of said video signal at said editing location for converting said first frame address to said second frame address.

* * * * *